United States Patent [19]

Chorlton

[11] Patent Number: 5,641,057
[45] Date of Patent: Jun. 24, 1997

[54] BUCKET ELEVATOR CONVEYORS

[75] Inventor: Derek Carr Chorlton, Staffordshire, United Kingdom

[73] Assignee: Gough Holdings (Engineering) Limited, Staffordshire, England

[21] Appl. No.: 424,270

[22] PCT Filed: Oct. 15, 1993

[86] PCT No.: PCT/GB93/02139

§ 371 Date: May 25, 1995

§ 102(e) Date: May 25, 1995

[87] PCT Pub. No.: WO94/10070

PCT Pub. Date: May 11, 1994

[30] Foreign Application Priority Data

Oct. 21, 1992 [GB] United Kingdom ............... 9222049

[51] Int. Cl.$^6$ .................. B65G 17/36; B65G 23/00
[52] U.S. Cl. ........................... 198/708; 198/792
[58] Field of Search ........................ 198/708, 703, 198/712, 706, 792, 853

[56] References Cited

U.S. PATENT DOCUMENTS

| 628,274 | 7/1899 | Maruel | 198/708 |
|---|---|---|---|
| 631,718 | 8/1899 | Hunt et al. | 198/708 |
| 650,233 | 5/1900 | Ebbert | 198/706 |
| 1,098,564 | 6/1914 | Finn | 198/712 |
| 1,111,823 | 9/1914 | Coldren | 198/712 |
| 3,854,575 | 12/1974 | Fraioli, Sr. | 198/853 X |
| 4,293,067 | 10/1981 | Anderson | 198/851 |
| 4,736,832 | 4/1988 | Rinio | 198/712 |
| 4,958,721 | 9/1990 | Redford | 198/710 |

FOREIGN PATENT DOCUMENTS

| 0 212 858 | 3/1987 | European Pat. Off. . |
|---|---|---|
| 91 07 669.2 | 10/1991 | Germany . |
| 1007576 | 10/1965 | United Kingdom . |

OTHER PUBLICATIONS

Materials Handling News, "Bucket Conveyors Keep Coffee Free of Damage," Mar. 1986, p. 49.

*Primary Examiner*—William E. Terrell
*Assistant Examiner*—Richard A. Chandler
*Attorney, Agent, or Firm*—Adams Law Firm, P.A.

[57] ABSTRACT

The bucket conveyor system is made up of buckets which are pivotally suspended between two chains and run around an endless circuit. The claims are made up of links being connected by pins in elongated holes. This chain can be compressed to make its length less than when it is under tension. The chain is compressed at the loading station to force the buckets into direct contact with each other and allow continuous 10 loading. At the discharge station the chain is put under tension to space the buckets and allow them to be rotated through 360° to empty out their contents. Guides are positioned at the areas where the chain is under compression to stop buckling from occurring. The system is driven by a motor and sprockets which also control the compression or tension of the chain.

12 Claims, 3 Drawing Sheets

BUCKET ELEVATOR CONVEYORS

This application is a national stage application, according to Chapter II of the Patent Cooperation Treaty. This application claims the priority date of Oct. 21, 1992 for Great Britain Patent Application No. 9222049.0.

The present invention relates to improvements in bucket elevator conveyor systems used for the gentle transport of loose materials and is particularly concerned with the systems that allow for continuous feeding of the loose material into the carrying bucket without spillage and without damage thereto.

Bucket elevator conveyor systems are known in which buckets, in spaced apart relationship, are rotatably supported between two chains that enables them to negotiate corners on a path in one plane, the buckets being arranged to be inverted at a desired discharge station. In order to achieve continuous filling of the buckets, necessary for efficient operation of the system, the chains, in one type of system, have to be collapsed in order to bring the buckets close together and minimise spillage, adequate chain control to produce this effect is difficult to achieve.

Elevators of this type are used for handling a very wide range of materials that are required to be handled gently during production and/or packaging to avoid damage. Such materials include, for example, peanuts, confectionery, milk powder, tile dust, carbon black, precious metal powders, cereals, pasta, chocolate, semi-liquids and delicate or volatile materials.

We have now devised a bucket elevator conveyor system which overcomes the problems associated with known systems such as those described above. In our system there is provided a body housing a track to route at least one chain through an endless circuit, a means for driving the chain and buckets pivotally mounted thereon for movement therewith, the said chain comprising a multiplicity of links connected together by pins pivoting in elongated holes such that the length of a section of the chain increases when in tension compared with its length when in compression, means being provided to cause a said section of the chain to be in compression at one part of the circuit where materials can be continuously loaded (a loading station). The spacing of the buckets is such that when the chain is in this section it is in compression and the buckets are in contact one with another. When the buckets traverse the upper sections of the circuit the chain is in tension and the buckets can be rotated through 360° about the pivotal mountings to discharge their contents at any given part of the circuit, e.g. a discharge station, without colliding with each other.

Preferably the buckets are pivotally suspended between two chains.

Preferably also means are provided for ensuring that when a said section of the chain is in compression it adopts a relatively stiff state. Suitable means for achieving this effect may comprise guide elements surrounding the track on three sides and/or, preferably, adjacent links being provided with interlocking portions that engage when the chain is in compression to reduce the tendency of the chain to buckle and causing it to become rigid in the plane of movement.

The driving means may comprise one or more sprockets driven by an electric motor; the means for bringing a section of the chain into compression at a loading station may comprise a pair of sprockets rotatably mounted at either end of the said loading station and spaced at a distance apart equivalent to the compressed length of the chain in that section. The chain drive should be on the entry side of the said section and may comprise the appropriate one of said sprockets.

One embodiment of the invention will now be described with reference to the accompanying drawings in which.

Figure 1:
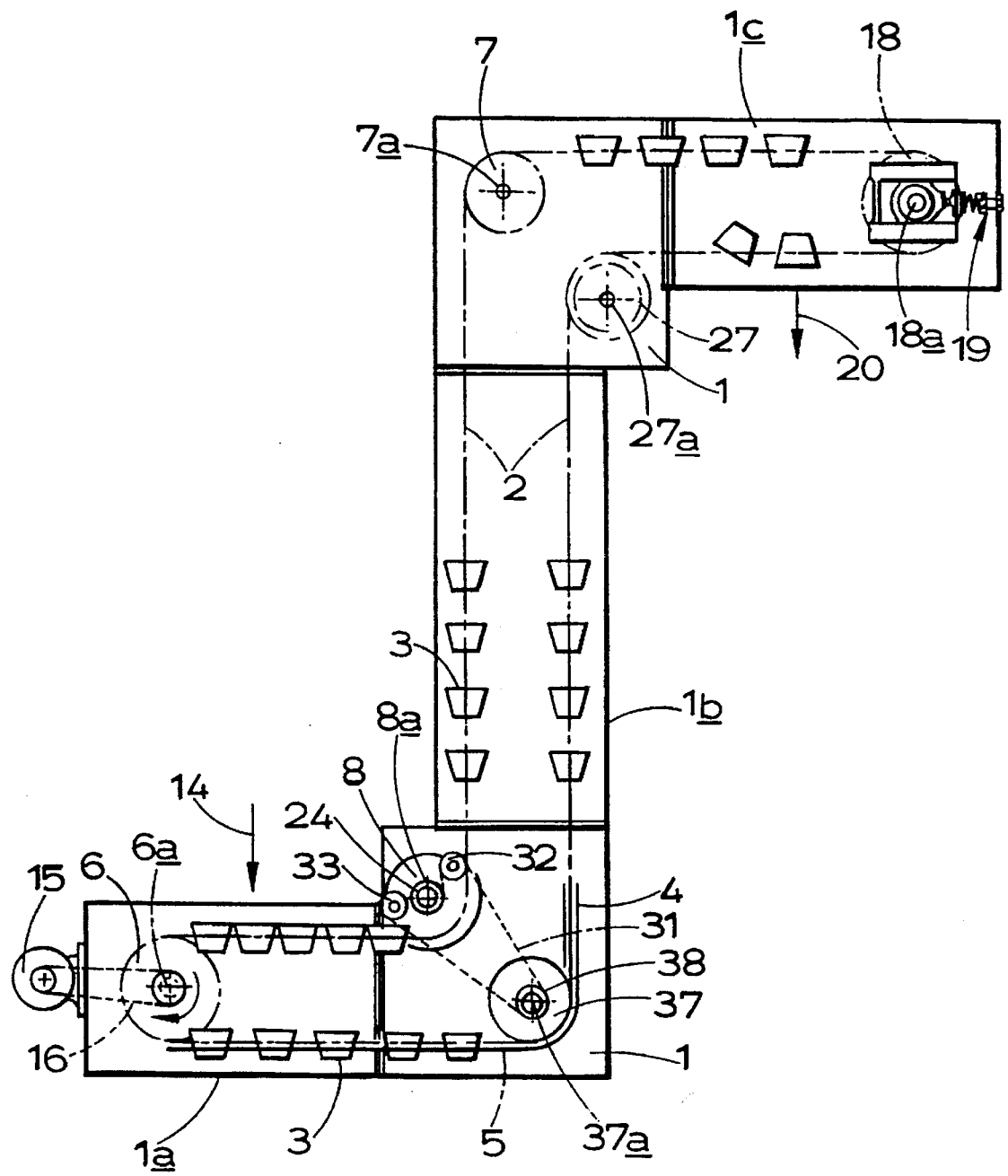
FIG. 1 is a diagrammatic side view of a bucket elevator conveyor system according to the present invention.
Figure 2:
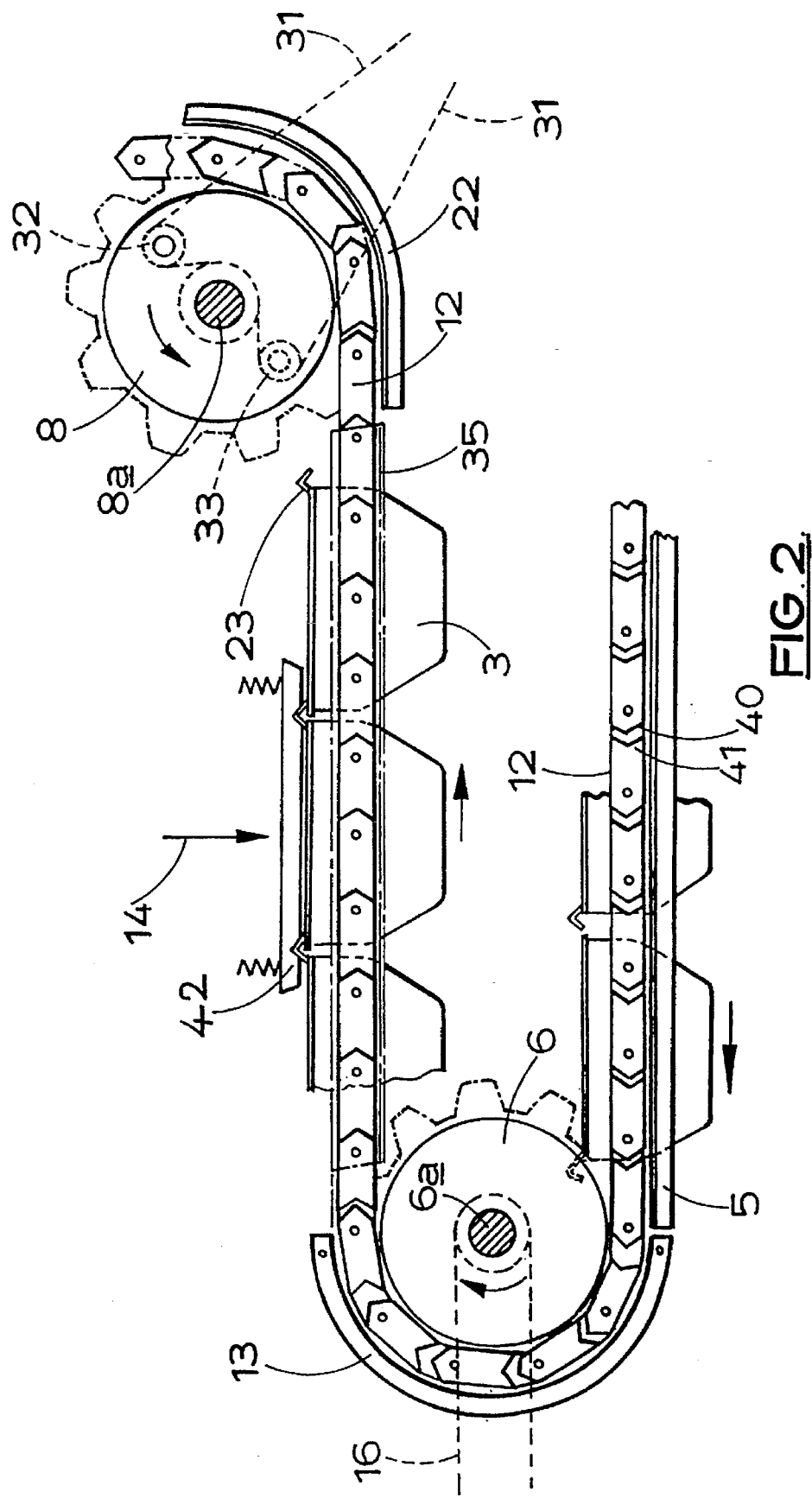
FIG. 2 is a diagrammatic view of the loading station of the circuit of FIG. 1.
Figure 3:
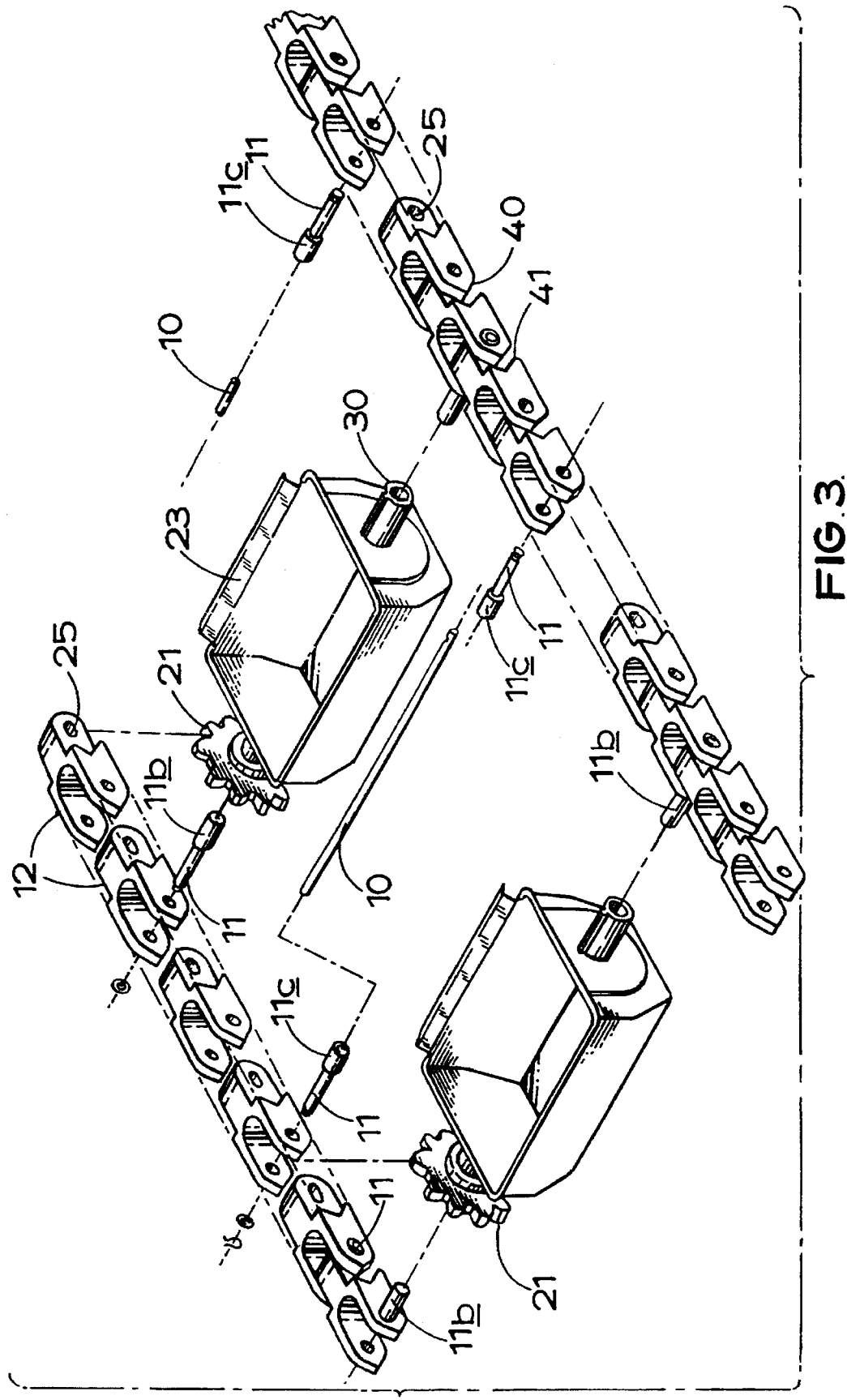
FIG. 3 is an exploded diagrammatic illustration of a chain and bucket assembly for use with the system of FIGS. 1 and 2.

Referring to the drawings, a bucket elevator system of the present invention comprises an outer framework generally indicated at 1 having a horizontal first section 1a at one level, a vertical section 1b and a second horizontal section 1c at the second higher level. The said framework houses a circuit of parallel flexible chains 2 consisting of chain links 12 having slotted pivot locations 25 and joined by pivot pins 11 (see FIG. 3). The chains move through a loading station 14, in frame section 1a, along a U-shaped guide 35 and in a substantially horizontal path, a vertical section 1b and a discharge station 20 in frame section 1c, in which the chains are again substantially horizontal and at a higher level.

The chains are driven by a pair of sprockets 6, located immediately before the loading station 14, and an electric motor 15 coupled to sprockets 6 by chain 16. The chains are maintained in engagement with sprockets 6 by an encapsulating shroud 13. From sprocket 6 the chains pass over a first pair of control sprockets 8 positioned after the loading station 14 and are maintained in engagement therewith by an encapsulating shroud 22. The chains then move upwardly over guide sprockets 7 and thence horizontally to pass round a terminal sprocket 18 to move horizontally in the opposite direction to a discharge station 20. The chains turn round a second pair of guide sprockets 27 downwardly through chain guide 4 to a second pair of control sprockets 37 and thence horizontally back to drive sprockets 6.

Terminal sprocket 18 is carried for free rotation about shaft 18a journalled into bearings with sliding mounts and spring loaded at 19 to apply a small tension to the extended chain circuit.

Sprockets 6, 7, 8, 27 and 37 are rotatably carried on common shafts 6a, 7a, 8a, 27a and 37a respectively, each shaft being journalled into bearings secured in frame 1. The sprockets have the same number and pitch of teeth in order that each forwards the chain at the same speed.

Suspended between the chains are buckets 3 carried on inwardly extending end portion 11b of pivot pins 11 that engage in hollow spigots 30 extending outwardly from each side of buckets 3. Gears 21 are non-rotatably secured to spigots 30 on one side of each bucket. Alternatively the male pins can be on the chains and the hollow spigots formed in the bucket trunnions.

The parallel chains 2 are maintained at a constant distance apart by use of tie bars 10 which locate in hollow ends 11c of pivot pins 11 and are positioned between any or all pairs of buckets.

To avoid spillage at the feeding station buckets 3 are provided with overlap member lips 23 located along one side thereof and extending outwardly to extend over an adjacent bucket side edge to provide cover for the space between buckets when they are juxtaposed at the loading station 14.

The chain links 12 are formed with V-shaped portions 40 at one end that interlock with complimentary shaped portions 41, formed in the opposite end of an adjacent link, when the chain is in compression causing the links to lock into a rigid section. When the chain is under tension portions 40 and 41 separate to allow articulation.

Control sprockets 8 and 37 are connected by chain 31 passing over the snubs 32 and 33 located either side of drive elements 24 on sprockets 8 and corresponding elements 38 on sprockets 37 whereby sprockets 8 and 37 are caused to rotate at the same speed and maintain correct rotation and correct closed or compressed chain pitch control throughout this section.

In setting up the conveyor system the relative positions of drive sprockets 6 and control sprockets 8 are arranged such that the chain is in a closed rigid and compressed state at the feed station 14 causing the buckets 3 to lie in near touching relationship with the overlap portions 23 of one bucket extending over the opposed edge of an adjacent bucket. To further control the positioning of the buckets 3 in a horizontal position at the feed station 14, and to provide stability to the buckets, a spring-loaded hollow frame 42 contacts the side top edges of the buckets as they pass through the feed station.

In use, with the chains 2 at the feed station 14 in a compressed and rigid condition, buckets 3 are continuously filled with the material to be transferred and drive sprocket 6 propels the chain around control sprocket 8 into the vertical section 1b of frame 1. Terminal sprocket 18 is carried on bearings with sliding mounts and spring-loaded to apply a tension to the chain circuit other than the circuit chain positioned between central sprockets 8 and 37 as it passes round sprocket 6. The chain links slide into the extended state through the upper section of the circuit allowing the buckets 3 to swing freely about the support pivots 11b. Buckets 3 pass around the upper sprockets 7 and 27 and the terminal sprocket 18 to the discharge point where bucket gears 21 engage a toothed rack (not shown) which causes the buckets to rotate through 360° during which rotation material contained in the buckets is discharged. Thereafter the buckets continue around the circuit back to the feed station.

I claim:

1. A bucket elevator conveyor system, comprising:
   (a) a track for moving at least one chain through an endless circuit including a loading station and a discharge station;
   (b) a plurality of buckets pivotally mounted on the chain for movement therewith, and to receive material at the loading station and discharge material at the discharge station and drive means to drive the chain;
   (c) said chain comprising a multiplicity of links connected together by pins pivoting in elongated holes formed in the links such that the length of a section of the chain is greater when in a tensioned condition;
   (d) compression means for compressing a section of the chain into a compression condition at the loading station, the spacing of the buckets being such that when the chain is in said compression condition, adjacent edge portions of the buckets are in contact and when the chain is in said tensioned condition the buckets can be rotated through 360° about an axis on which the buckets are carried.

2. A bucket elevator conveyor according to claim 1, wherein the buckets are pivotally suspended between two of said chains.

3. A bucket elevator conveyor according to claim 2, including interlocking means for interlocking the links and placing the chain into a rigid state when in said compression condition.

4. A bucket elevator conveyor according to claim 3, wherein said interlocking means includes guide elements partially encapsulating each of said chains.

5. A bucket elevator conveyor according to claim 3 wherein said interlocking means includes interlocking portions provided on adjacent links for engagement when said chains are in said compression condition, which interlocking portions are adapted to reduce the tendency of the chains to buckle in the plane of movement.

6. A bucket elevator conveyor according to claim 1 wherein the chain drive means comprises a sprocket member powered by a motor.

7. A bucket elevator conveyor according to claim 5, wherein said compression means comprises first and second sprockets rotatably mounted at the entry and exit ends of said section of the chain and spaced apart at a distance equivalent to the compressed length of said section of chain, the chain drive means being positioned on the entry side of said chain section.

8. A bucket elevator conveyor according to claim 7 wherein the chain drive sprocket is mounted at the entry end of said chain section.

9. A bucket elevator conveyor system, comprising:
   (a) a track for moving at least one chain through an endless circuit including a loading station and a discharge station;
   (b) a plurality of buckets pivotally mounted on the chain for movement therewith, and to receive material at the loading station and discharge material at the discharge station and chain drive means to drive the chain, the chain drive means comprises a sprocket member powered by a motor;
   (c) said chain comprising a multiplicity of links connected together by pins pivoting in elongated holes formed in the links such that the length of a section of the chain is greater when in a tensioned condition; and
   (d) compression means for compressing a section of the chain into a compression condition at the loading station, the spacing of the buckets being such that when the chain is in said compression condition, adjacent edge portions of the buckets are in contact and when the chain is in said tensioned condition the buckets can be rotated through 360° about an axis on which the buckets are carried, said compression means comprising first and second sprockets rotatably mounted at the entry and exit ends of said section of the chain and spaced apart at a distance equivalent to the compressed length of said section of chain, the chain drive means being positioned on the entry side of said chain section.

10. A bucket elevator conveyor according to claim 9 wherein the chain drive sprocket is mounted at the entry end of said chain section.

11. A bucket elevator conveyor according to claim 1 or 9, wherein stabilizing means are provided to stabilize the buckets in a substantially horizontal position when passing through the section of the chain in said compression condition.

12. A bucket elevator conveyor according to claim 11, wherein said stabilizing means comprises a spring-loaded hollow frame member dimensioned to contact and bear down on the top edge of the buckets during their passage through said chain section.

* * * * *